UNITED STATES PATENT OFFICE.

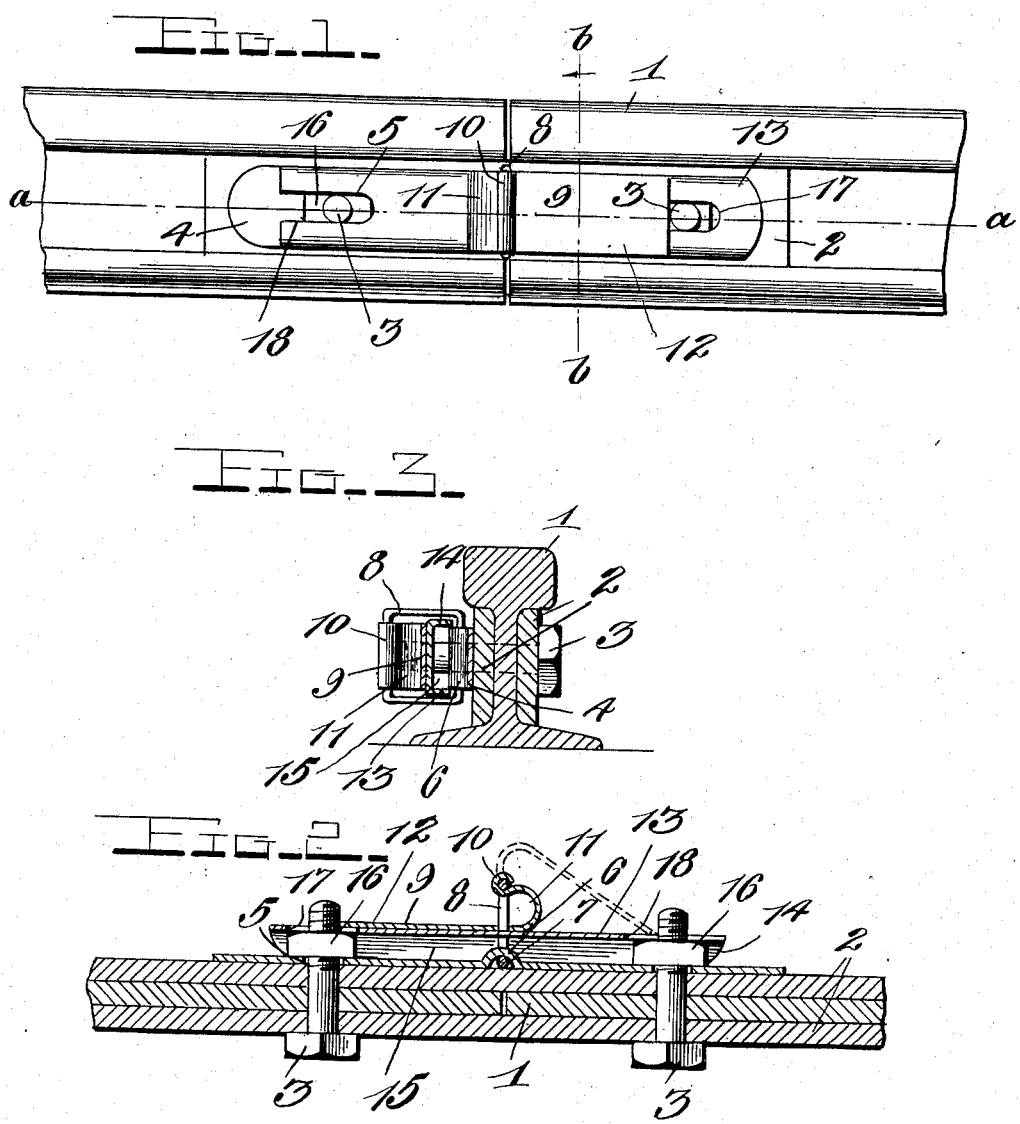

LEWIS W. HUBER, OF BROOKVILLE, PENNSYLVANIA.

NUT-LOCK.

1,015,316. Specification of Letters Patent. Patented Jan. 23, 1912.

Application filed April 12, 1911. Serial No. 620,587.

*To all whom it may concern:*

Be it known that I, LEWIS W. HUBER, a citizen of the United States, residing at Brookville, in the county of Jefferson and State of Pennsylvania, have invented certain new and useful Improvements in Nut-Locks, of which the following is a specification, reference being had to the accompanying drawings.

This invention relates to improvements in nut locks, and particularly for locking the nuts of railway joints, the object of the invention being to provide improved devices which may be employed at a rail joint for locking the nuts on the bolts, so that they cannot become loosened or detached, the invention consisting in the construction, combination and arrangement of devices, hereinafter described and claimed.

In the accompanying drawings—Figure 1 is a side elevation of a rail joint provided with my improved nut locking devices. Fig. 2 is a horizontal sectional view of the same on the plane indicated by the line a—a of Fig. 1. Fig. 3 is a vertical transverse sectional view of the same on the plane indicated by the line b—b of Fig. 1.

For the purposes of this specification, the meeting ends of a pair of rails are shown at 1, the usual fish plates being indicated at 2, and the usual bolts being indicated at 3.

In accordance with my invention, I provide a base plate 4, of a size and shape adapting it to fit on one of the fish plates and provided with openings 5, through which the bolts 3 extend. This base plate may extend across the joint between the rails and is provided at its center with a transverse semi-cylindrical off-set 6, which provides a groove 7 on its inner side. One side of a link 8 is placed in the said groove so that the link is pivotally and detachably connected to the locking plate. A cam spring 9, is pivotally connected at one end as at 10, to the outer side of the link. This cam spring has a curved substantially semi-cylindrical inner end portion 11, from which extends a spring arm 12. I also provide a locking plate 13, which is provided with in-turned side flanges 14, thereby forming a channel 15, for the reception of the nuts 16 of the bolts, the channeled side of the said locking plate being presented to the base plate 4. This locking plate extends through the link 8, and is provided with slots 17 for the reception of the projecting threaded ends of the bolts. The said locking plate is also provided at one end with a slot 18, the outer end of which is open, and it is adapted to engage one of the bolts. By the provision of the open slot 18, and the closed slots 17, the channeled locking plate may be readily placed on the outer sides of the nuts and its slots engaged by the threaded projecting ends of the bolts, and it will be obvious that owing to the provision of its side flanges 14, which engage opposite sides of the nuts, the latter will be prevented from turning casually and will be securely locked. After the locking plate has been inserted through the link 8, and engaged with the nuts, the cam spring is turned so as to cause its arm 12, to bear on the outer side of the locking plate, and one end of the said arm to engage one side of one of the bolts, thereby the cam spring is held in place and it will be understood that the tension of its semi-cylindrical portion 11, on the outer side of the locking plate keeps the latter in locked position on the nuts and bolts.

To remove the locking plate, it is first necessary to disengage the spring arm 12 from the bolt and then turn the cam spring to the position shown in dotted lines in Fig. 2. The locking plate is then free to move outwardly in the link so that it can be disposed at the required inclination with respect to the base plate to disengage its slots from the ends of the bolts. It will also be understood that after the base plates have been removed, the link can be disconnected from the base plate owing to the provision of the groove 7.

I claim:—

1. The herein described nut locking devices comprising a base plate to bear against the inner sides of the nuts, a link pivotally connected to the base plate, a cam spring pivotally connected to the link and a locking plate for insertion in the link, and provided with slots to clear the outer ends of the bolts, and also provided with means to engage the nuts and prevent them from turning on the bolt, the locking plate being held in place on the nuts by the said cam spring.

2. In combination with a rail joint having fish plates and bolts, a base plate bearing against one of the fish plates, and under the nuts, a link pivotally connected to the base plate, a cam spring pivotally connected to the outer side of the said link, and provided with an arm, and a channel locking plate adapted to be passed through the said link and disposed with its channeled side on the outer sides of the nuts, said locking plate having slots to clear the projecting ends of the bolts, the said cam spring being adapted to be turned to bear on the outer side of the locking plate, and to engage its spring arm with one of the bolts.

3. In combination with a rail joint having fish plates and bolts, a base plate bearing against one of the fish plates, and under the nuts, a link pivotally connected to the base plate, and detachable therefrom, a cam spring pivotally connected to the outer side of the said link, and provided with an arm, and a channel locking plate adapted to be passed through the said link, and disposed with its channeled side on the outer sides of the nuts, said locking plate having slots to clear the projecting ends of the bolts, the said cam spring being adapted to be turned to bear on the outer side of the locking plate, and to engage its spring arm with one of the bolts.

In testimony whereof I hereunto affix my signature in the presence of two witnesses.

LEWIS W. HUBER.

Witnesses:
LEWIS G. BROSIUS,
A. M. KEIFER.

---

Copies of this patent may be obtained for five cents each, by addressing the "Commissioner of Patents, Washington, D. C."